United States Patent
Bender et al.

(10) Patent No.: US 10,674,192 B2
(45) Date of Patent: Jun. 2, 2020

(54) SYNCHRONIZING MULTIPLE COMPUTERS PRESENTING COMMON CONTENT

(71) Applicant: International Business Machines Corporation, Armonk, NY (US)

(72) Inventors: Michael Bender, Armonk, NY (US);
Craig M. Trim, Glendale, CA (US);
Todd R. Palmer, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 16/022,771

(22) Filed: Jun. 29, 2018

(65) Prior Publication Data
US 2020/0007915 A1    Jan. 2, 2020

(51) Int. Cl.
| | | |
|---|---|---|
| H04N 7/16 | (2011.01) | |
| H04N 21/242 | (2011.01) | |
| H04N 21/6332 | (2011.01) | |
| H04N 21/43 | (2011.01) | |

(52) U.S. Cl.
CPC ....... *H04N 21/242* (2013.01); *H04N 21/4302* (2013.01); *H04N 21/6332* (2013.01)

(58) Field of Classification Search
CPC ............. H04N 21/242; H04N 21/4302; H04N 21/6332
USPC .......................................................... 725/17
See application file for complete search history.

(56) References Cited

U.S. PATENT DOCUMENTS

| | | | |
|---|---|---|---|
| 9,332,160 B1 | 5/2016 | Chenillo et al. | |
| 9,338,523 B2 | 5/2016 | Owen | |
| 9,601,126 B2 | 3/2017 | Owen | |
| 2011/0265089 A1* | 10/2011 | Ostojic | G06F 9/4818 |
| | | | 718/103 |
| 2015/0120953 A1* | 4/2015 | Crowe | H04L 65/60 |
| | | | 709/231 |
| 2017/0127123 A1* | 5/2017 | Lidow | H04N 21/4331 |
| 2017/0181113 A1 | 6/2017 | Keyser-Allen et al. | |

(Continued)

OTHER PUBLICATIONS

P. Mell, et al. "The NIST Definition of Cloud Computing", NIST Special Publication 800-145, Sep. 2011, Gaithersburg, MD.

(Continued)

*Primary Examiner* — Pankaj Kumar
*Assistant Examiner* — Sahar Aqil Riaz
(74) *Attorney, Agent, or Firm* — Brian M. Restauro, Esq.; George S. Blasiak, Esq.; Heslin Rothenberg Farley & Mesiti PC

(57) ABSTRACT

Methods, computer program products, and systems are presented. The method computer program products, and systems can include, for instance: obtaining a first media stream, the first media stream being played on a first playback device and having first timestamps indicating when respective different time ordered sections of data defining the first media stream have been played by the first playback device; obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times.

20 Claims, 10 Drawing Sheets

(56) References Cited

U.S. PATENT DOCUMENTS

2017/0264665 A1* 9/2017 Stevens ................ H04L 65/605
2017/0289220 A1* 10/2017 Bloch ................. H04L 65/4092
2019/0171726 A1* 6/2019 Ahmed ............ G06F 16/90332
2019/0215332 A1* 7/2019 Kaplan ................. H04L 45/70

OTHER PUBLICATIONS

Microsoft, et al "Automatic Measurement of Audio/Video Synchronization in Digital Media Playback" IPCOM000204197D, Feb. 17, 2011.
Anonymous, "Automated Video Creation Using Audio and Video Components Extracted from Videos Based on a Received Script for the Video" IPCOM000237079D, May 29, 2014.
Anonymous, "Tone Insertion to Indicate Timing or Location Information" IPCOM000252122D, Dec. 15, 2017.
DVB, "Digital Video Broadcasting (DVB); Companion Screens and Streams; Part 2: Content Identification and Media Synchronization" DVB Document A167-2, Jun. 2016.

* cited by examiner

SYNCHRONIZING MULTIPLE COMPUTERS PRESENTING COMMON CONTENT

BACKGROUND

Streaming media is multimedia that continuously received by and presented to an end-user while being delivered by a provider. A client end-user can use a media player to play a data file (such as a digital file of a movie or song) before an entire file has been transmitted. For providing real time communications, a streaming media transmission service can be configured to operate in accordance one or more protocol appropriate for use in streaming of media such as the Real-time Transport Protocol (RTP), which is set forth in Requests for Comments (RFC) 3550, published by the Internet Engineering Taskforce (IETF) and the Internet Society (ISOC), the Real Time Streaming Protocol (RTSP), the Hypertext Transfer Protocol (HTTP), and/or the Real-Time Messaging Protocol (RTMP).

SUMMARY

Shortcomings of the prior art are overcome, and additional advantages are provided, through the provision, in one aspect, of a method. The method can include, for example: obtaining a first media stream, the first media stream being played on a first playback device and having first timestamps indicating when respective different time ordered sections of data defining the first media stream have been played by the first playback device; obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times; examining the first media stream and the second media stream, wherein the examining includes processing one or more timestamp of the first timestamps and one or more timestamp of the second timestamps; generating, based on the examining, timing difference data that specifies a difference in playback timing between the first media stream and the second media stream being played, respectively, by the first playback device and the second playback device; and using the timing difference data for performing synchronizing of the first media stream and the second media stream.

In another aspect, a computer program product can be provided. The computer program product can include a computer readable storage medium readable by one or more processing circuit and storing instructions for execution by one or more processor for performing a method. The method can include, for example: obtaining a first media stream, the first media stream being played on a first playback device and having first timestamps indicating when respective different time ordered sections of data defining the first media stream have been played by the first playback device; obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times; examining the first media stream and the second media stream, wherein the examining includes processing one or more timestamp of the first timestamps and one or more timestamp of the second timestamps; generating, based on the examining, timing difference data that specifies a difference in playback timing between the first media stream and the second media stream being played, respectively, by the first playback device and the second playback device; and using the timing difference data for performing synchronizing of the first media stream and the second media stream.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining a first media stream, the first media stream being played on a first playback device and having first timestamps indicating when respective different time ordered sections of data defining the first media stream have been played by the first playback device; obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times; examining the first media stream and the second media stream, wherein the examining includes processing one or more timestamp of the first timestamps and one or more timestamp of the second timestamps; generating, based on the examining, timing difference data that specifies a difference in playback timing between the first media stream and the second media stream being played, respectively, by the first playback device and the second playback device; and using the timing difference data for performing synchronizing of the first media stream and the second media stream.

Shortcomings of the prior art are overcome, and additional advantages are provided, through the provision, in one aspect, of a method. The method can include, for example: examining a first media stream and a second media stream, wherein the first media stream is being played on a first playback device and wherein the second media stream is being played on a second playback device; generating, based on the examining, correction data in dependence on timing differences between the first media stream and the second media stream; and using the correction data for performing synchronizing of the first media stream.

In another aspect, a computer program product can be provided. The computer program product can include a computer readable storage medium readable by one or more processing circuit and storing instructions for execution by one or more processor for performing a method. The method can include, for example: examining a first media stream and a second media stream, wherein the first media stream is being played on a first playback device and wherein the second media stream is being played on a second playback device; generating, based on the examining, correction data in dependence on timing differences between the first media stream and the second media stream; and using the correction data for performing synchronizing of the first media stream.

In a further aspect, a system can be provided. The system can include, for example a memory. In addition, the system can include one or more processor in communication with the memory. Further, the system can include program instructions executable by the one or more processor via the memory to perform a method. The method can include, for example examining a first media stream and a second media stream, wherein the first media stream is being played on a first playback device and wherein the second media stream is being played on a second playback device; generating, based on the examining, correction data in dependence on timing differences between the first media stream and the second media stream; and using the correction data for performing synchronizing of the first media stream.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
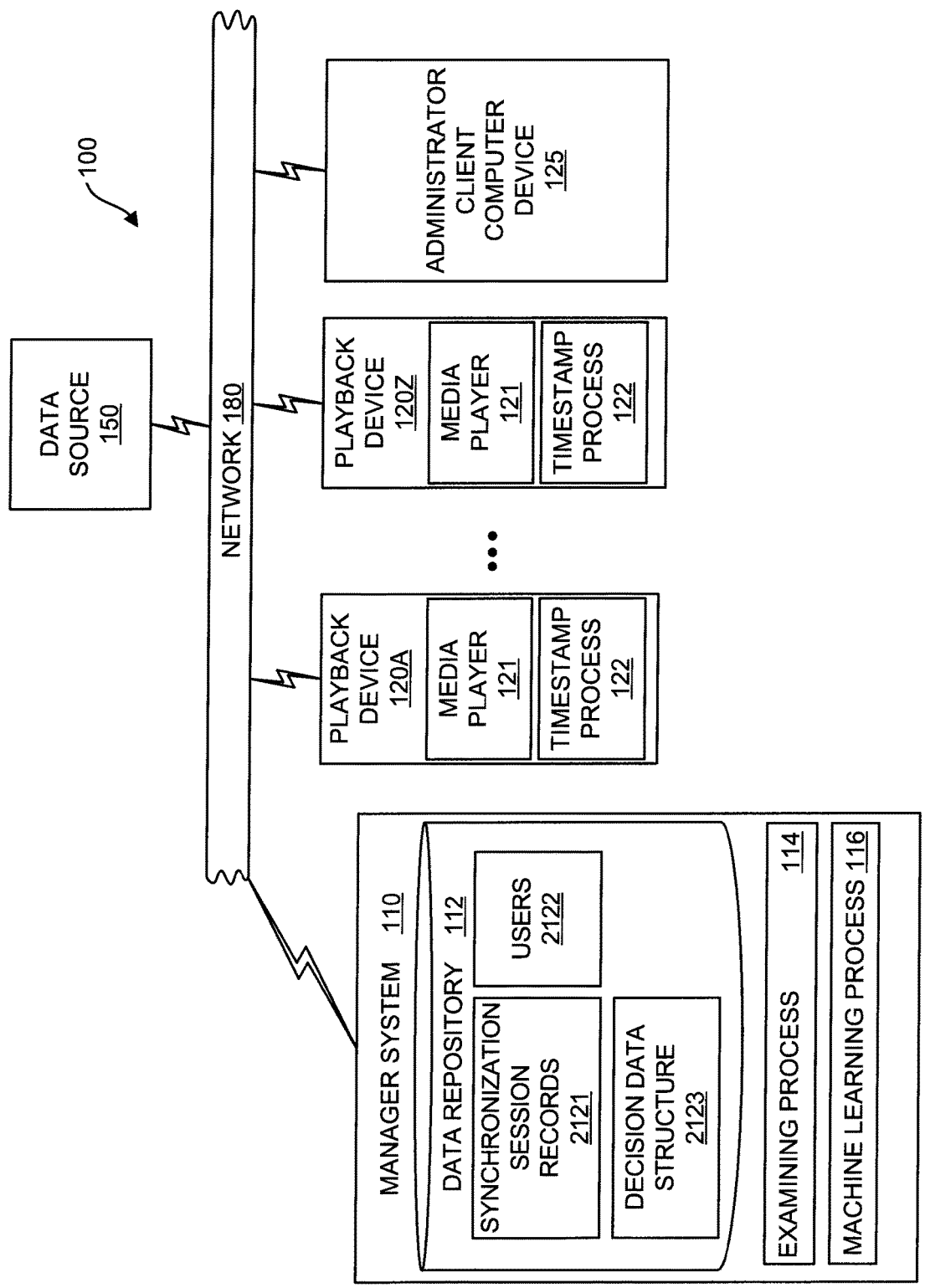
FIG. 1 is a block diagram of a system having a manager system and playback devices according to one embodiment.

System 100 for use in supporting playback synchronization processes is set forth herein is illustrated in FIG. 1. System 100 can include manager system 110, playback devices 120A-120Z, administrator client computer device 125 and data source 150. Manager system 110, playback devices 120A-120Z, administrator client computer device 125 and data source 150 can be provided by computing node based systems and devices. Manager system 110, playback devices 120A-120Z, administrator client computer device 125 and data source 150 can be connected together by network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110, playback devices 120A-120Z, administrator client computer device 125, and data source 150 can be external to one another. According to one embodiment, one or more of manager system 110, playback devices 120A-120Z, administrator client computer device 125 and data source can be co-located with one another.

Manager system 110 can run examining process 114 and machine learning process 116. Manager system 110 running examining process 114 can include for example manager system 110 examining audio data and/or video data from playback devices of playback devices 120A-120Z. The audio data and/or video data can be timestamped and the examining can include examining to include timing difference data indicating a level of desynchronization between playback devices of playback devices 120A-120Z. Playback devices 120A-120Z can be provided, e.g. by televisions, smart TVs, and/or computer devices such as, e.g. laptops, tablets, smartphones, and the like. Timing difference data can be included as correction data. Playback devices 120A can simultaneously play media commonly obtained from data source 150. Data source 150 can be provided e.g. by a media server such a recorded media server or a live broadcast media server.

There is set forth herein according to one embodiment obtaining by manager system 110 a first media stream, the first media stream being played on a first playback device and having first timestamps indicating when respective different time ordered sections of data defining the first media stream have been played by the first playback device; obtaining by manager system 110 a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times; examining by manager system 110 the first media stream and the second media stream, wherein the examining includes processing one or more timestamp of the first timestamps and one or more timestamp of the second timestamps; generating by manager system 110, based on the examining, timing difference data that specifies a difference in playback timing between the first media stream and the second media stream being played, respectively, by the first playback device and the second playback device; and using the timing difference data for performing synchronizing of the first media stream and the second media stream. According to one embodiment, time ordered sections of a played media stream as set forth herein can be provided by what are referred to as e.g., time ordered "frames" or "segments" or another term in dependence on an encoding format of media being streamed.

Manager system 110 can include data repository 112 having synchronization session records area 2121. Synchronization session records can include records respecting synchronization sessions, wherein first and second, and sometimes additional playback devices, are subject to synchronization. The records in synchronization session records area 2121 can include, e.g. the initiation time of the synchronization session, the time period of the synchronization session, timing difference data of the session, e.g. at the commencement of the session before correction to perform synchronization, and playback device IDs specifying the playback devices.

In users area 2122 data repository 112 can store data on users of system 100 who are persons benefitting from the features of system 100. Persons benefitting from the use of system 100 can be persons in environments who view playback devices. User data stored in users area 2122 can include IDs and data on registered users of system 100 e.g. users of an establishment application who register with system 100 using the application. User data stored in users area 2122 can include IDs and data on unregistered users e.g. data on users who are recognized via facial recognition and who are allocated an unregistered user ID. There can be associated to user IDs (registered or unregistered user) various data on the users. The various data can include e.g. roles of the users if they are of an enterprise, favorites of the users, facial feature data of the users and the like.

In decision data structure area 2123 data repository 112 can store one or more decision data structure used by manager system 110 to make decisions regarding synchronization schemes based on e.g. environmental factors. For example, manager system 110 can enforce a policy whereby a certain playback device is specified to be a priority playback device based on certain conditions occurring. For example, a decision data structure can encode various conditions that when occurring in combination cause an action decision to be returned. An action decision can be an action decision to prioritize one playback device of a set of playback devices being subject to synchronization.

An audio stream can be compressed to make the file size smaller using an audio coding format. A video stream can be compressed using a video coding format to make the file size smaller. Encoded audio and video streams are assembled in a container "bitstream" such as MP4, FLV, WebM, ASF or ISMA. Video coding formats can include e.g. H.264, HEVC, VP8 or VP9. For providing real time communications, a streaming media transmission service can be configured to operate in accordance one or more protocol appropriate for use in streaming of media such as the Real-time Transport Protocol (RTP), which is set forth in Requests for Comments (RFC) 3550, published by the Internet Engineering Taskforce (IETF) and the Internet Society (ISOC), the Real Time Streaming Protocol (RTSP), the Hypertext Transfer Protocol (HTTP), and/or the Real-Time Messaging Protocol (RTMP). A media stream, e.g. audio or video media stream can be delivered from a streaming server to a streaming client (e.g., the computer user with their Internet-connected laptop) using a transport protocol, e.g. RTP. A streaming transport protocol can be used to send audio or video from an event venue to a "cloud" transcoding service and CDN, which then uses HTTP-based transport protocols to distribute the video to individual venues and users. A streaming client (the end user) can interact with a streaming server using a control protocol, such as MMS or RTSP.

Figure 2:
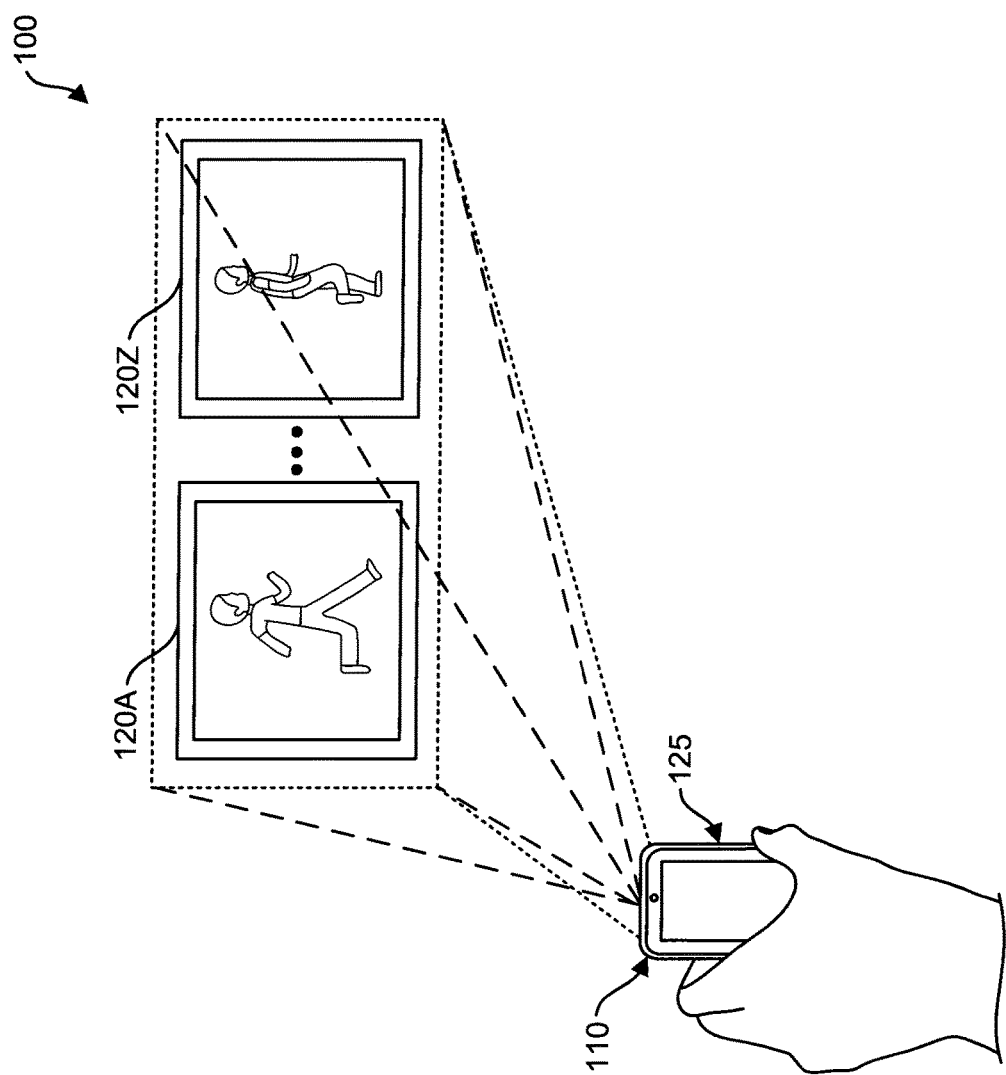
FIG. 2 is a physical environment view of the system as set forth in FIG. 1 according to one embodiment.

FIG. 2 is a physical view of system 100. In the environment depicted in FIG. 2, manager system 110 can be provided by a handheld computer device, e.g. a smartphone. Playback devices 120A-120Z can be provided by establishment mounted playback devices, e.g. at a sports restaurant, conference center, classroom, a home, a library and the like. As indicated in FIG. 2, playback devices 120A-120Z can be simultaneously presenting common content of a same event but the audio and/or video feeds may not be in sync. As indicated in FIG. 2, common characters are being displayed on playback devices 120A-120Z from a common scene, but due to desynchronization of the video feeds of the video playback between the devices, the devices are in different stages of action. A flowchart illustrating operation of system 100 according to one embodiment is set forth in FIG. 3. Playback devices 120A-120Z can be commonly disposed in a common environment provided by a physical environment. Playback devices 120A-120Z can be simultaneously viewed by a single user in the environment such that the single user is able to observe timing differences between the playback devices 120A-120Z.

Figure 3:
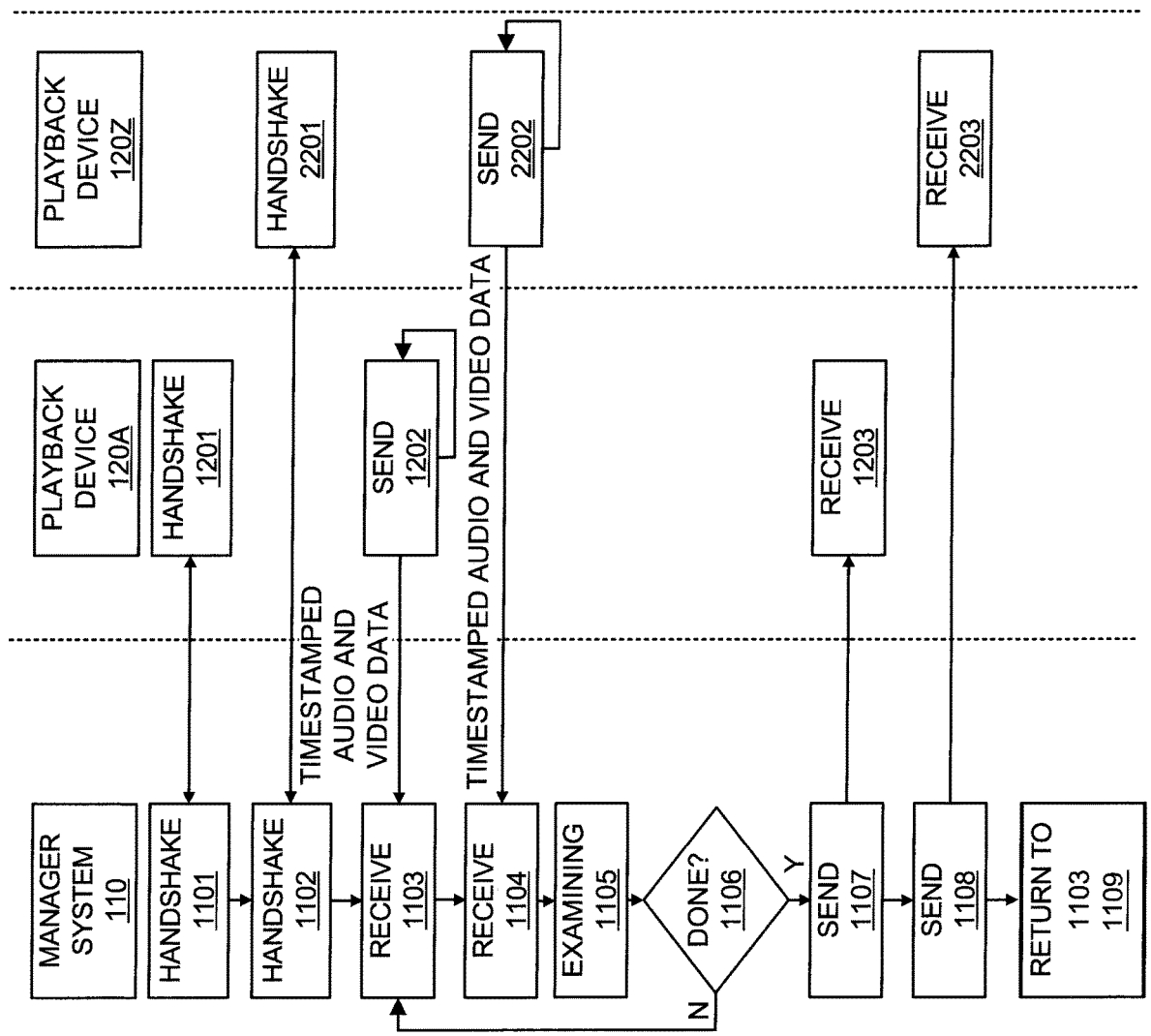
FIG. 3 is a flowchart depicting a method that can be performed by manager system interoperating with playback devices according to one embodiment.
Figure 4:
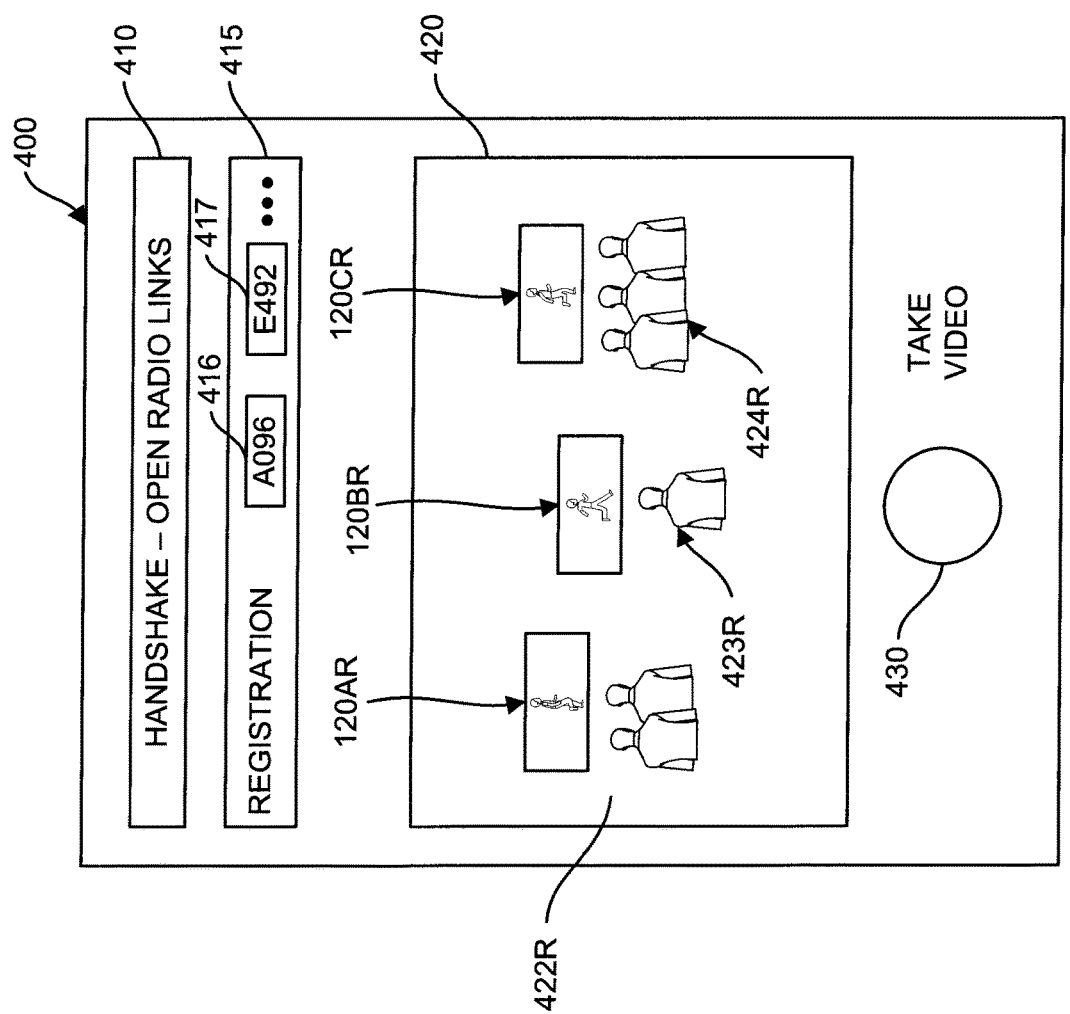
FIG. 4 depicts an administrator user interface that can be displayed on a display of an administrator client computer device according to one embodiment.

The flowchart of FIG. 3 indicates interoperations between manager system 110, playback device 120A and playback device 120Z as depicted in FIGS. 1 and 2. At blocks 1101 and 1201, manager system 110 and playback device 120A can execute handshaking operations so that a communication link, e.g. a radio communication link is established between manager system 110 and playback device 120A. At block 1102 and 2201, manager system 110 and playback device 120Z can perform handshaking operations so that a communication link is established between manager system 110 and playback device 120Z. For performance of handshaking operations depicted with reference to blocks 1101, 1102, 1201, and 2201, administrator user interface 400 as depicted in FIG. 4 can be used.

User interface 400 can be a displayed user interface displayed on a computer device used by an administrator user. Administrator user interface 400 can be displayed on administrator client computer device 125 as depicted in FIG. 2. In some use cases, administrator client computer device 125 can be co-located with manager system 110. In the physical form view of FIG. 2, manager system 110 and administrator client computer device 125 can be co-located on a common device.

Multiple methodologies are possible for manager system 110 initiating a synchronization session. With reference to user interface 400 as shown in FIG. 4, manager system 110 can initiate a synchronization session in response to an administrator user selecting identifiers of playback devices using a user interface.

Figure 5:
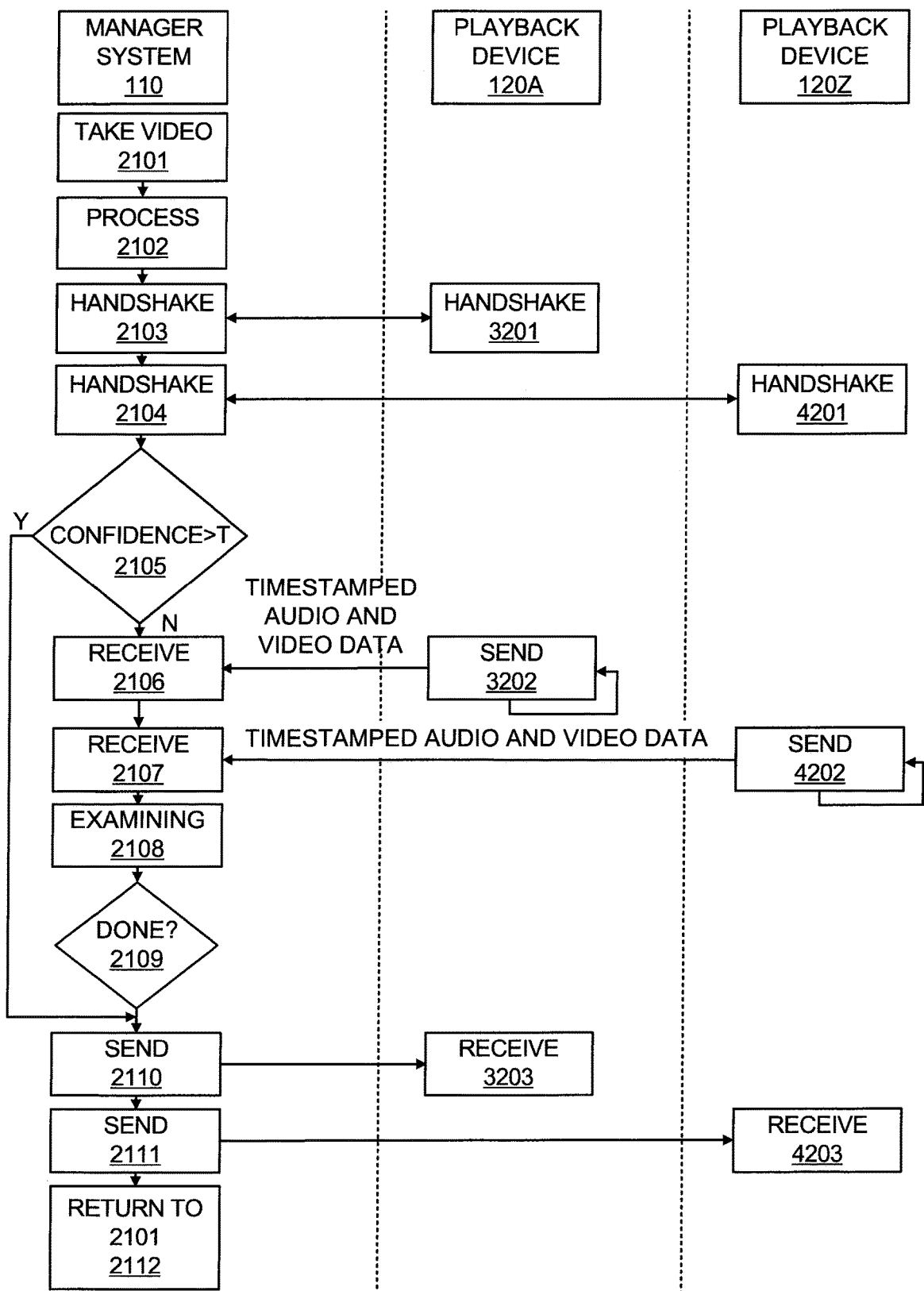
FIG. 5 is a flowchart depicting operations of a manager system interoperating with playback devices according to one embodiment.

Based on actuation of handshake area 410 of administrator user interface 400 (FIG. 4) manager system 110 can discover available playback devices in radio signal communication with manager system 110. In registration area 415, identifiers of radio transceiver equipped playback devices can appear to which manager system 110 is able to connect. Single clicking an indicator, e.g. 416 or 417 can register the playback device specified by the indicator, e.g. A096 or E492 so that manager system 110 can track all future operations of the playback device. Where a playback device is previously registered into system for tracking a special icon can be displayed. By selecting via double clicking on one of the indicators, 416 and/or 417, a user using user interface 400 can indicate that the playback device specified by the specifier in area 415 is to be included in a synchronization session. System 100 can be configured so that when more than one playback device indicator is selected for inclusion in the synchronization session, the synchronization session can automatically commence, e.g. by the sending of timestamped audio and video data and block 3202 from playback device 120A and the sending of timestamped audio and video data from playback device 120Z. The timestamped audio and video data sent at block 3202 and can be received by manager system 110 at block 2106. The timestamped audio and video data sent at block 4202 can be received by manager system 110 at block 2107 and examining can proceed at block 2108 (FIG. 5).

Manager system 110 according to one embodiment set forth further herein can initiate a synchronization session in response obtaining of image data representing playback devices.

In further reference to the flowchart of FIG. 3, examining at block 1105 can include comparing timestamps between common audio features and/or common video frames and based on a determining that an audio and/or video stream is not synchronized, manager system 110 provides timing difference data indicating the level of the desynchronization between audio and/or video streams of the first and second playback devices. A first media stream (audio or video) from a first playback device and a second media stream from a second playback device playing common content can have common elements but can be desynchronized in time. Manager system 110 for return of timing difference data can examine first and second media streams of first and second playback devices and can identify matching elements between the streams (a common audio feature in the case of an audio stream, a common frame in the case of a video stream). On the identification of matching features, manager system 110 can read timestamps of the common features. Manager system 110 can return the timestamp timing difference as timing difference data indicating an amount of desynchronization between elements of first and second media streams.

There is set forth herein according to one embodiment obtaining by manager system 110 a first media stream, the first media stream being played on a first playback device and having first timestamps indicating when respective different time ordered sections of data defining the first media stream have been played by the first playback device; obtaining by manager system 110 a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times; examining by manager system 110 the first media stream and the second media stream, wherein the examining includes processing one or more timestamp of the first timestamps and one or more timestamp of the second timestamps; generating by manager system 110, based on the examining, timing difference data that specifies a difference in playback timing between the first media stream and the second media stream being played, respectively, by the first playback device and the second playback device; and using the timing difference data for performing synchronizing of the first media stream and the second media stream.

Manager system 110 at block 1106 can determine that timing difference data has been sufficiently developed, upon which manager system 110 can proceed to blocks 1107 and 1108 to send correction data to playback device 120A and playback device 120Z. Correction data can include the returned timing difference data returned at block 1105. Correction data which when processed by a playback device permits the playback device to correct desynchronization and to achieve synchronization between playback device 120A and playback device 120Z. In response to receipt of correction data at blocks 1203 and 2203 respectively, playback device 120A and/or playback device 120Z can implement corrections so that playback devices 120A and 120Z are synchronized.

Correction data received at blocks 1203 and 2203 can include timing difference data that indicates an amount of desynchronization between audio streams and/or video streams being played on playback devices 120A and 120Z, respectively. Playback devices 120A and 120Z can respond to the correction data to achieve synchronization. At blocks 1203 and 2203, where playback device 120A (Alpha) is behind playback device 120Z (Beta) data synchronization action can include the following: (1) increase playback speed on playback device 120A to sync with playback device 120Z, (2) decrease the speed on playback device 120A to sync with playback device 120Z, or (3) simultaneously increase speed on playback device 120A while decreasing speed on playback device 120Z. In the described embodiment, first and second playback devices can be synchronized. In another embodiment, first, second and up to Nth playback devices can be synchronized, all of which can be selected using area 415 of user interface 400.

At block 1109 manager system 110 can return to block 1103 to receive additional timestamped audio and video data. For achieving synchronization, each of playback device 120A and playback device 120Z can include a media player that permits a playback speed to be either increased or decreased. The media player can be used to control a speed of playback of audio streaming data and/or video data. It is described in reference to blocks 1203 and 2203 that playback devices 120A and 120Z can achieve synchronization by altering of playback speed.

System 100 can be configured so that synchronization can be achieved via alternative methodologies. According to one methodology, media player speed can be adjusted. According to one embodiment, system 100 can be configured so that synchronization can be achieved by adjustment of CPU loading features and/or network features.

According to one embodiment, at receive block 1103 and receive block 1104, manager system 110 can receive from playback devices 120A and 120Z, respectively, data in addition to timestamped audio and video data. Namely, at receive blocks 1103 and 1104, manager system 110 can receive metric data. The metric data can include, e.g. CPU loading data of the processing node associated to a playback device, e.g. playback devices 120A-120Z, and metric data can also include, e.g. radio signal strength data indicating a strength of a signal received from a network to which playback device 120A is attached and/or which playback device 120Z is attached.

In such an embodiment, correction data can include correction data sent at blocks 1107 and 1108 including timing difference data indicating the timing relationship between playback device 120A and playback device 120Z, as well as the CPU loading data and/or the network signal strength data for each of playback device 120A and playback device 120Z. In the described example, the first playback device can have data of the second playback device's CPU and/or network signal strength. The second playback device can have data of the first playback device's CPU and/or network signal strength. Configuration data specifying a synchronization control can be conditioned based on the received CPU loading or network signal strength data. For example, a primary synchronization control specifying control of a first playback device can be disabled on the condition that CPU loading of a second playback device is below (or above) a threshold.

In the case that playback device 120A is behind in timing relative to playback device 120Z, the following can be performed: (1) playback device 120A can unload one or more running processes so that a speed of playback device 120A is increased or (2) playback device 120A can connect to a stronger network if available, e.g. network 180 as shown in FIG. 1 can include first and second subnetworks, e.g. first and second physical IEEE 802.11 networks. Playback device 120A currently connected to a first IEEE 802.11 network can connect to a second IEEE 802.11 network if available. In such a situation where playback device 120A (Alpha) is behind playback device 120Z (Beta) system 100 can be configured so that playback device 120Z, responsively slows down its operation, e.g. by running additional processes to slow its CPU operation down and/or by connecting to another network of lesser signal strength. Additional features are described with reference to the physical form view of FIG. 2 and the flowchart of FIG. 5 illustrating manager system 110 interoperating with playback device 120A and playback device 120Z, as well as with reference again to user interface 400 as shown in FIG. 4.

Tables A, B, and C summarize various controls for synchronization of a first playback device 120A and a second playback device 120Z.

TABLE A (Playback Device 120A is Behind Playback Device 120Z)

| Method | Description |
|---|---|
| 1 | Speed up playback device 120A |
| 2 | Slow down playback device 120Z |
| 3 | Speed up playback device 120A and slow down playback device 120Z |

As indicated in Table A, there are multiple methods for achieving synchronization, in the use case that playback device 120A is behind playback device 120Z. According to a first method, playback device 120A can be sped up, i.e. a speed of playback device 120A can be increased. However, in some cases where playback device 120A is playing an un-delayed live event speeding up may not be permitted. According to the second method, the speed of playback device 120Z can be decreased. According to a third method specified in Table C, a speed of playback device 120A can be increased and simultaneously a speed of playback device 120Z can be decreased.

TABLE B (Methods for Speeding up a Playback Device)

| Method | Description |
|---|---|
| 1 | Speed up media device |
| 2 | Unload one or more active CPU process |
| 3 | Join a faster network (higher signal strength) |

Table B illustrates various methods for performing a speed up of a playback device. According to one method, a media player speed can be increased, according to a second method process unloading can be performed on a CPU of the playback device, and according to a third method a network connection of a playback device can be switched to a stronger network. Methods 2 and 3 can independent of whether manager system 110 receives metrics data indicating CPU loading metrics and/or network signal strength metrics of playback devices subject to synchronization.

TABLE C (Slowing Down a Playback Device)

| Method | Description |
|---|---|
| 1 | Slow down media player |
| 2 | Add process for CPU loading |
| 3 | Join a weaker network |

Table C specifies methods for reducing a speed of a playback device. According to a first method, a media player can be reduced, according to a second method CPU loading can be increased, and according to a third method a playback device can be switched to connect to a slower network (lower signal strength).

Returning to the flowchart of FIG. 3, manager system 110 at examining block 1105 can determine a synchronization scheme for synchronizing playback devices. Manager system 110 can include data specifying a synchronization scheme with correction data sent at block 1107 and block 1108. Synchronization scheme data can specify e.g. which playback devices are to be controlled (e.g. the first, the second or both). Synchronization scheme data can also specify the manner in which playback devices are to be controlled (e.g. as set forth in Table B or C). Thus, correction data in one embodiment can include timing difference data as set forth herein and synchronization scheme data. Synchronization scheme data can include prioritization data which indicates which of a set of playback devices is prioritized. Further aspects of prioritization features as set forth herein wherein one playback device can be prioritized over another are set forth herein.

System 100 can be configured to include various prioritization features. According to a prioritization feature, manager system 110 prioritizes a first playback device of a set of playback devices being synchronized over a second playback device of a set of playback devices being synchronized. Additional features of system 100 are described with reference to FIG. 2 showing a physical environmental view of system 100, user interface 400 as shown in FIG. 4, and the flowchart of FIG. 5 showing manager system 110 interoperating with playback devices 120A and 120Z.

According to one embodiment, manager system 110 can count people associated with different physical playback devices and can establish schemes for carrying out synchronization of the playback devices based on the number of people associated with each playback device. Referring again to FIG. 2, in a physical environment playback devices 120A and 120Z can be at different locations of an establishment, e.g. first and second locations, there can be X amount of people at a location of first playback device and Y amount of people at a location of playback device 120Z.

Further description of a person count based prioritization scheme is provided in reference to user interface 400 as shown in FIG. 4.

Area 420 of user interface 400 is a representation of an environment, e.g. a preview moving view snapshot of an establishment environment displayed within display area 420 of user interface 400. The view area illustrates representation 120AR of a first playback device, representation 120BR of a second playback device, and representation 120CR of a third playback device and different sets of one or more people associated with each playback device. There are two people represented by 422R associated with the first playback device, one person represented by 423R associated to the second playback device, and three people represented by 424R associated to the third playback device. Manager system 110 can be configured so that on actuation of control 430 to take a video, manager system 110 processes frames of image data of the video and using image processing and recognition techniques, counts the number of people associated to each playback device. For performing person counting and playback device association, manager system 110 can employ various processes, e.g. can employ cellular network based, IEEE 802.11 network based, Global Positioning System (GPS) based, and/or image data processing based locating of people within an environment.

Manager system 110 can establish a prioritization scheme based on the number of people associated to each playback device. In the described example, manager system 110 can establish a synchronization scheme so that the third playback device having three people associated therewith is accorded highest priority based on it having the most amount of people associated therewith.

System 100 can be configured so that when a certain playback device of a set of playback devices for synchronization is specified to have a highest priority, a synchronization scheme is absent of control of the certain playback device. The speed of the prioritized certain playback device goes unchanged so that person(s) viewing the prioritized certain playback device enjoy unchanged viewing the prioritized playback device.

Thus, in the described scenario described in reference to area 420 where the third playback device is behind in timing of the second playback device a synchronization scheme can include decreasing a speed of the second playback device without increasing (or changing at all) the speed of the third playback device. Accordingly, people represented by representation 424R (watching the third playback device) can enjoy seamless uninterrupted viewing of the third playback device represented by representation 120CR.

According to one prioritization scheme, prioritization can be based on identities of people in an environment. In some embodiments as described with reference to FIG. 4 people represented by representations 422R, 423R, and 424R can be registered users of system 100 and their respective identities can be detected by various detection methods applied by system 100. For example, where people having respective mobile computer devices are in a venue of an enterprise and their mobile devices are running an application of the enterprise their identities and locations can be detected using radio signal based technologies, e.g. BLUETOOTH® beacon sensing technologies and WIFI based location sensing technologies (BLUETOOTH® is a registered trademark of Bluetooth SIG, Inc.). For performing person counting and playback device association, manager system 110 can employ various processes, e.g. can employ cellular network based, IEEE 802.11 network based, Global Positioning System (GPS) based, and/or image data processing based locating of people within an environment.

In such an embodiment, users using such open applications can be prompted to enter data respecting their preferences with respect to viewing content. In such an embodiment, manager system 110 can apply a prioritization scheme, wherein a prioritized playback device is prioritized based on it being matched to that person's favorite content. For example, there can be first and second playback devices in an environment. Manager system 110 processing the indicated data of an enterprise application and data of content of playback devices can determine that the content of the first playback device is mismatched with respect to the preference of a person associated to the first playback device but that the common content of the second playback device is matched with respect to the preference of a person associated to the second playback device. Manager system 110 in such a scenario can prioritize the second playback device.

FIGS. 2 and 4 indicate an embodiment wherein manager system 110 provided by a mobile computer device can be used to take a video of an environment and subject the environment representation to processing. It will be understood of course, that external camera systems can also alternatively be used to obtain image data of an environment externally from a mobile computer device. In addition, alternative people counting technologies can be used, e.g. radio signal based, in which person locations are calculated by processing of signals obtained from an IEEE 802.11 network.

According to another prioritization scheme, manager system 110 can prioritize playback devices being synchronized based on roles of persons associated to playback devices. Roles triggering prioritization can include such roles as "company president" "executive" "head coach" "lead surgeon" and the like. In some embodiments, obtained image data obtained by system 100 performs facial recognition or performs radio signal processing relative to persons associated to different playback devices and can establish a priority in a synchronization scheme based on a role of a person associated to a playback device.

According to another prioritization scheme, manager system 110 can prioritize playback devices being synchronized based on a combination of factors. For example, manager system 110 can prioritize a first or a second playback device by application of the scoring function as set forth in Eq. 1 wherein $$S = F1 \cdot W1 + F2 \cdot W2 \qquad (\text{Eq. 1})$$

Where S is a scoring function applied to a playback device, F1 is a crowd size factor, F2 is a crowd knowledge factor and W1 and W2 and weights associated to the various factors. F1, the crowd size factor, can be obtained by counting persons associated to (e.g. within a threshold distance) of a first and second playback device. For performing person counting and playback device association, manager system 110 can employ various processes, e.g. can employ cellular network based, IEEE 802.11 network based, Global Positioning System (GPS) based, and/or image data processing based locating of people within an environment. The second factor F2 can be determined by taking the average of each person's knowledge of a subject matter of content of a playback device. A "0" can be allocated if playback content matches a person's favorite. A "1" can be allocated if playback content does not match a person's favorite. Between a first playback device scored according to Eq. 1 and a second playback device scored according to Eq. 1, manager system 110 can prioritize the playback device having the higher score. According to the scoring function of Eq. 1, prioritization performed by manager system 110 between a first playback device and second playback device can be based on a combination of a crowd size factor (more likely to be prioritized to large crowds) and a crowd knowledge factor (more likely to be prioritized to unknowledgeable crowds).

According to a first policy a playback device playing content matching a favorite of a person viewer of the playback device can be assigned priority based on the theory the person viewer user will be more attentive to the content and therefore more likely to be affected by a disruption of the content playback. According to an alternate second policy a playback device playing content mis-matching a favorite of a person viewer of the playback device (i.e.

indicating the person viewer is less knowledgeable of the played content) can be assigned priority based on the theory the person viewer user needs to be more attentive to the content and therefore should not be presented with a discontinuity of the content playback.

The flowchart of FIG. 5 illustrates additional features that can be implemented. According to one embodiment, desynchronization detection can be performed by examining of obtained video data and can be initiated in response to the obtaining of an image data representation of playback devices. Referring to the flowchart of FIG. 5, manager system 110 at block 2101 can be controlled to take a video of an environment. For example, an administrator user of manager system 110 can actuate control 430 as set forth in FIG. 4, e.g. by actuation of control 430 initiate taking of a video of an environment.

The video of the environment as depicted in area 420 of FIG. 4 can include playback device representations 120AR, 120BR, and 120CR. Manager system 110 at block 2102 (FIG. 5) can be configured to process the captured video data to ascertain whether the first playback device is ahead in timing of the second playback device or alternatively behind in timing relative to the second playback device (to develop timing difference data of the streams). Referring to FIG. 4, manager system 110 and playback devices 120A-120Z at blocks 2103 and 3201 and at blocks 2104 and 4201 can perform handshaking operations, e.g. which can be initiated using areas 410 and 415 of user interface 400 so that playback device 120A and playback device 120Z are in network connection with manager system 110.

At block 2105 manager system 110 can determine whether the timing data between playback device 120A and 120Z determined at block 2102 is above a threshold confidence. The threshold confidence value can be based, e.g. on the resolution of the image data processed for the determination of timing difference between audio and video streams of the different playback devices 120A and 120Z. If the confidence is above the threshold, manager system 110 can proceed to block 2110 and 2111 to send correction data to playback devices 120A and 120Z for receipt by playback devices 120A and 120Z respectively, at blocks 3203 and 4203.

The correction data can include timing difference data indicating a relationship between audio streams and video streams being played on playback devices 120A and 120Z. The correction data can also include synchronization scheme data. Playback devices 120A and 120Z can respond to the correction data by methods set forth herein, e.g. by speeding up one of the playback devices, slowing down one of the playback devices, or simultaneously speeding up while slowing down the playback devices. Playback speed can be controlled, e.g. by controlling media player speed, by way of CPU loading control as set forth herein, or by way of network control as set forth herein, e.g. switching from a low signal strength network to a high signal strength network.

At block 2112 manager system 110 can return to block 2101 to take another video of an environment. Manager system 110 at block 2105 can determine that a confidence level associated with timing data derived by image processing is less than a threshold. In such an instance, manager system 110 can proceed to blocks 2106, 2107, 2108, and 2109 which can perform in the manner of blocks 1103, 1104, 1105, and 1106 as described in the flowchart of FIG. 3.

At block 3202 playback device 120A can send a timestamped audio and video data stream for receipt by manager system 110 at block 2106. At block 4202, playback device 120Z can send to manager system 110 for receipt by manager system 110 at block 2107 timestamped audio and/or video stream data of playback device 120Z.

According to one embodiment, manager system 110 can be configured to predictively provide correction data for correcting of synchronization of playback devices without examining of time stamped audio and video data streams for the determination of timing data. According to one embodiment, manager system 110 can be configured to iteratively store playback ID and timing data combinations for time segments in which playback devices are active. For example, each instance of first and second playback devices being activated in timing data between the playback devices being derived, manager system 110 can record a data record of this activation and instance in data repository 112 of manager system 110. The recorded playback IDs and timing data combinations for each instance can include uncorrected timing data, i.e. timing data prior to synchronization being corrected. Thus, the instance records can indicate a true relationship of timing between playback devices in their natural state without synchronization correction being applied.

Manager system 110 can use decision data structures to establish synchronization schemes. Decision data structures of manager system 110 can define polices of manager system 110 and can be stored in decision data structure area 2123 of data repository 112. Table A illustrates a decision data structure for use in establishing a synchronization scheme in dependence on a count of persons associated with first and second playback devices.

TABLE A

| Row | Timing Relationship | Population Profile | Network Characteristics | CPU loading characteristics | Synchronization Scheme |
|---|---|---|---|---|---|
| 1 | First playback device 120A is slower than second playback device 120B | Count of users associated with first playback device 120A > count of users associated with second playback device 120Z | Both first and second playback devices are on strong networks | CPU of each playback device has additional capacity | First playback device is given priority; Slow down second playback device 120Z by slowing down media player |
| 2 | First playback device 120A is faster than second playback device 120B | Count of users associated with first playback device 120A > count of users associated with second playback | Both first and second playback devices are on strong networks | CPU of first playback device has additional capacity; CPU of second playback | First playback device is given priority; Speed up second playback device by unloading program(s) |

TABLE A-continued

| Row | Timing Relationship | Population Profile | Network Characteristics | CPU loading characteristics | Synchronization Scheme |
|---|---|---|---|---|---|
| | | device 120Z | | device is overloaded | running on the second playback device |
| 3 | First playback device 120A is faster than second playback device 120B | Count of users associated with first playback device 120A < count of users associated with second playback device 120Z | Both first and second playback devices are on strong networks | CPU of first playback device has additional capacity; CPU of second playback device is overloaded | Second playback device is given priority; Slow down first playback device by reducing media player speed |
| N | ... | ... | ... | ... | ... |

The physical form view of FIG. 2, and the flowcharts of FIGS. 3 and 5 illustrate a use case wherein manager system 110 is external to both a first playback device and a second playback device being subject to synchronization. In another use case as set forth herein, manager system 110 can be co-located with one of a first playback device 120A or a second playback device 120Z. In such an embodiment, the playback device operating as manager system 110 can be regarded as the master playback device.

Referring to the flowcharts of FIG. 3 and FIG. 5, playback device 120A (at blocks 1202 and 3202) and playback device 120Z (at blocks 2202 and 4202) can be timestamping played media streams (e.g. audio and/or video) and can be streaming the timestamped media streams to manager system 110 which can examine the streams on receipt. System 100 can be configured so that playback device 120A and playback device 120Z are configured to provide media timestamping and streaming functionality on registration of the playback devices into system 100.

For example, system 100 can be configured so that in response to a certain playback device being registered into system 100 using area 415 of user interface 400 as set forth in reference to FIG. 4, an installation package e.g. including libraries and executable code, can be transmitted from manager system 110 to the certain playback device for installation on the certain playback device so that the certain playback device is configured to perform timestamping and streaming functionality with respect to played media content. Such installed installation package, e.g. including libraries and executable code, can also provision the playback device to perform the functions of manager system 110 so that the certain playback device can function as a master playback device in the described scenario wherein manager system 110 is co-located with a playback device.

In reference to the flowcharts of FIGS. 3 and 5, manager system 110 determining timing difference data between media streams can include manager system 110 examining timestamped media streams. In some embodiments, manager system 110 determining timing difference data between media streams can be absent of manager system 110 examining timestamped media streams and can include manager system 110 performing alternate processing One example of such alternative processing has been set forth herein. In reference to block 2102 (FIG. 5) manager system 110 can examine a video representation of first and second playback devices playing common content to determine timing difference between the playback devices.

In another example of an alternate processing to determine a timing difference between first and second playback devices, the first playback device can act as the master playback device (can have manager system 110 co-located therein) and can be configured process data provided by an audio input device of the first (master) playback device. The first (master) playback device will process first and second instances of the same sound pattern where the first and second playback devices are out of sync. The first (master) playback device can determine the time lag between the first and second instances of the same sound pattern and can used the determined time lag as a returned timing difference value indicative of a level of desynchronization between the first playback device and the second playback device.

Figure 6:
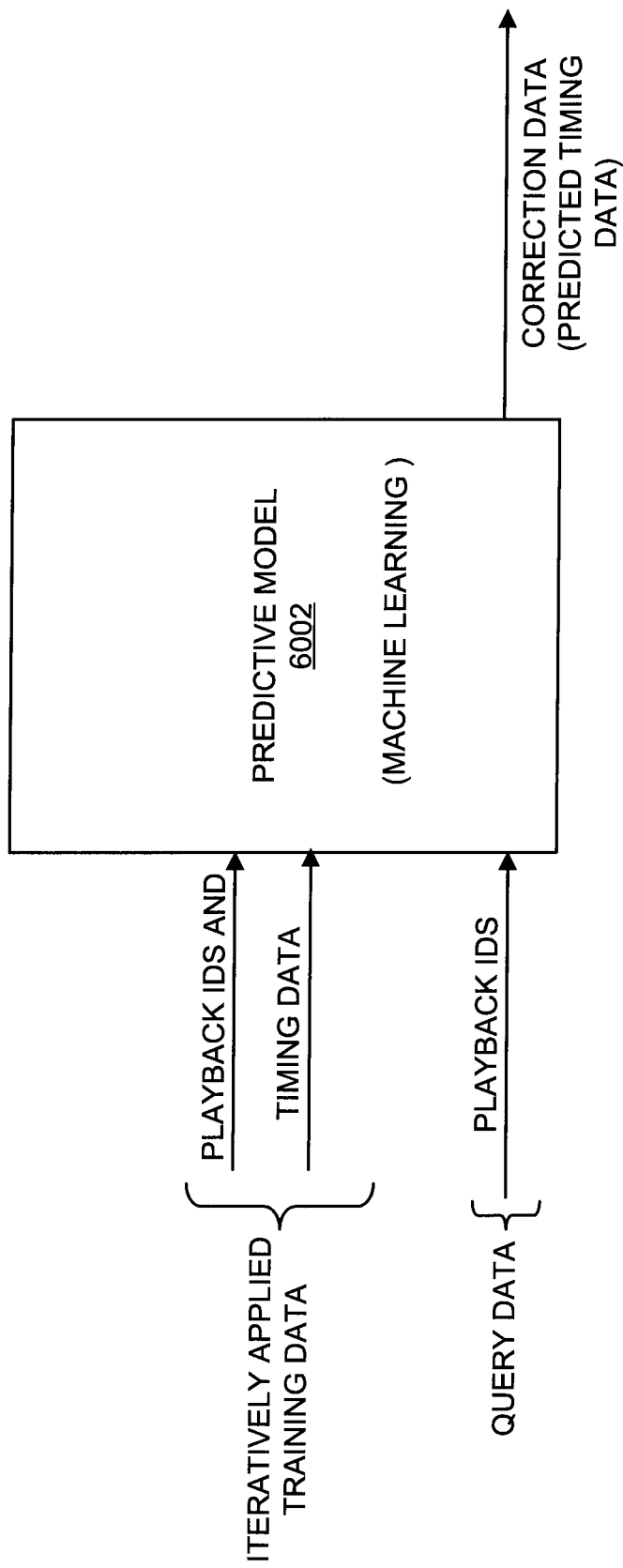
FIG. 6 depicts a machine learning process that can be performed according to one embodiment.

Referring to FIG. 6, predictive model 6002 can be iteratively trained with such synchronization session record instances. Namely, combinations of playback IDs and timing data instances associated with initial activation periods for first and second playback devices being activated and subject to synchronization correction. Manager system 110 can iteratively apply such training data, e.g. in response to each new synchronization process applied within an establishment, e.g. a restaurant, a conference center, and the like. With use of predictive model trained by machine learning, manager system 110 is able to learn the behaviors of associated sets of playback devices. Predictive model 6002 on being trained is able to respond to query data. Thus, as set forth in FIG. 6 predictive model 6002 in response to query data being applied to predictive model 6002, can output correction data. The correction data can be provided by predicted timing data, i.e. the predicted timing data between playback devices indicated by playback IDs. With use of predictive model 6002, which on being trained can be responsive to query data that provides correction data based on playback IDs being applied as query data, manager system 110 is able to quickly apply corrections for synchronization without performing examining of timestamped audio and/or video data as set forth in reference to examining block 1105 and examining block 2108.

Predictive model 6002 trained by machine learning processes can be used for anticipatory synchronization correction of playback devices that are active in an environment prior to performing of examining block 1105 (FIG. 3) or examining block 2108 (FIG. 5) or in some use cases can be used for correction without performance of the noted examining blocks 1105 or 2108.

Various available tools, libraries, and/or services can be utilized for implementation of predictive model 6002. For example, a machine learning service can provide access to libraries and executable code useful for support of machine learning processes. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Embodiments as set forth herein can perform image data processing e.g. of representations of playback devices to return timing difference data, of representations of people to perform people counting and/or for recognizing people via facial recognition. Image data processing can employ labeled training data which can be input into a pattern recognition system to provide supervised learning. Image data based pattern recognition processes can employ, e.g. classification algorithms such as supervised algorithms predicting categorical labels, clustering algorithms, e.g. unsupervised algorithms predicting categorical labels, ensemble learning algorithms, general algorithms for predicting arbitrarily structure sets of labels, real value sequence labeling algorithms, regression algorithms. Image data based pattern recognition algorithms can employ various digital image processing techniques, e.g. for classification feature extraction, multiscale signal analysis, and projection. Digital image processing techniques can include use of digital image transformations, such as application of digital filters which are useful for performance of feature extraction for detection, e.g. of edges, corners, blobs, and ridges. Shape based digital image processing techniques can use, e.g. techniques involving blob extraction, template matching, or Hough transforms.

Embodiments herein recognize that when multiple computers e.g. provided by playback devices as set forth herein are used to present the same content, they frequently do not present what look like mirror images.

When the audio and/or video are at different points in the presentation, problems for the viewer are introduced. Playback devices in proximity with each other (e.g. in a common environment) can be presenting common content at different points. According to one scenario an environment can be provided by an environment accessible by multiple persons, e.g. a sports restaurant, conference center, classroom, a home, a library and the like. According to one environment and environment can be provided by any environment wherein one user or multiple users observe content on computing node based multiple playback devices, e.g. a television and mobile smartphone computer device, a tablet computer and a laptop, a laptop and a mobile smartphone computer device. Timing differences can be attributable e.g. to network latency and/or differences CPU loading which can be in dependence e.g. on what other programs are using assets on respective playback devices.

There is set forth herein a system and method of modifying the speed of one or more playback devices presenting the same digital content. A method herein can include monitoring multiple devices and synchronizing their speeds when they are not consistent. Audio and video streams can be compared to understand the differences and adjust the speed. According to one embodiment, examinations of feeds can be performed by manager system 110 where manager system 110 is external to each of multiple playback devices. According to one embodiment, examinations of feeds can be performed by manager system 110 where manager system 110 is co-located with one of the multiple playback devices subject to a synchronization session. In such an embodiment, the one playback device in which manager system 110 is co-located can be regarded to be the master playback device.

According to one scenario an executive can be giving a virtual presentation and a large contingent of employees can be in a common area watching the presentation. Multiple laptops with displays can be set up for the audience to see. One of the laptops is in an area where the network is weaker and that content is always behind the others. Methods herein can be employed to achieve synchronization of the multiple playback devices.

According one scenario, two people are in a conference room attending the same virtual meeting. One person frequently re-enters the meeting after his display starts lagging. After further analysis, the root cause is due to CPU loading by other programs running on his laptop. Methods herein can be employed to achieve synchronization of the multiple playback devices.

According one scenario, a person is watching a movie with several other persons. In addition to watching on the big screen, he is watching the movie on his tablet computer device. Methods herein can be employed to achieve synchronization of the multiple playback devices.

For synchronizing first and second playback devices a plurality of options are set forth herein: (a) Increase speed on a first playback device (Alpha) to sync with a second playback device (Beta); (b) Decrease speed on the second playback device (Beta) to sync with the first playback device (Alpha); (c) Simultaneously increase speed on the first playback device (Alpha) and decrease speed on the second playback device (Beta). Manager system 110 can examine both displaced content (already reviewed) and upcoming content (unreviewed).

Manager system 110 can process data specifying a number of people involved. If a greater population is associated to (e.g. within a threshold distance of) first playback device and a smaller population is associated to a second playback device, the first playback device can be assigned higher priority. Such decisions can be a factor of policy. Priority between playback devices can be assigned based on the importance of content to one viewer over another. A person viewing a first playback device (Alpha) may already know the upcoming content, or be less interested. In this case, priority can be assigned to the second playback device (Beta).

Manager system 110 can learn the differences in the speed capabilities of a first playback device (Alpha) and a second playback device (Beta) and can modify the speed of the playback devices pro-actively.

A method as set forth herein can include: (a) registering first and second computers provided by playback devices that will be compared; (b) determining audience size for each computer (a person count of persons associated); (c) determining the relevance of the presented content for each audience (e.g. ascertaining whether the content presented by playback devices matches preferences of audience users); (d) providing timestamped audio and/or video streams to be examined; and (d) compare audio and/or video streams to see if they are in synch; (e) responsively to determining that the first computer is slower than a second computer checking network capacity including by checking whether a stronger network is available; (f) further responsively to determining that the first computer is slower than a second computer checking whether CPU speed limitations have been reached by the first computer and if CPU limitations have been reached determining whether other processes on the first computer be stopped; (g) checking a policy engine e.g. using a decision data structure to determine a selected method for speeding up the first computer; (h) speeding up the first computer according to a method based on an output of the policy engine, e.g. increasing media player speed, switching to a stronger network, and/or unloading one or more CPU process.

Figure 7:
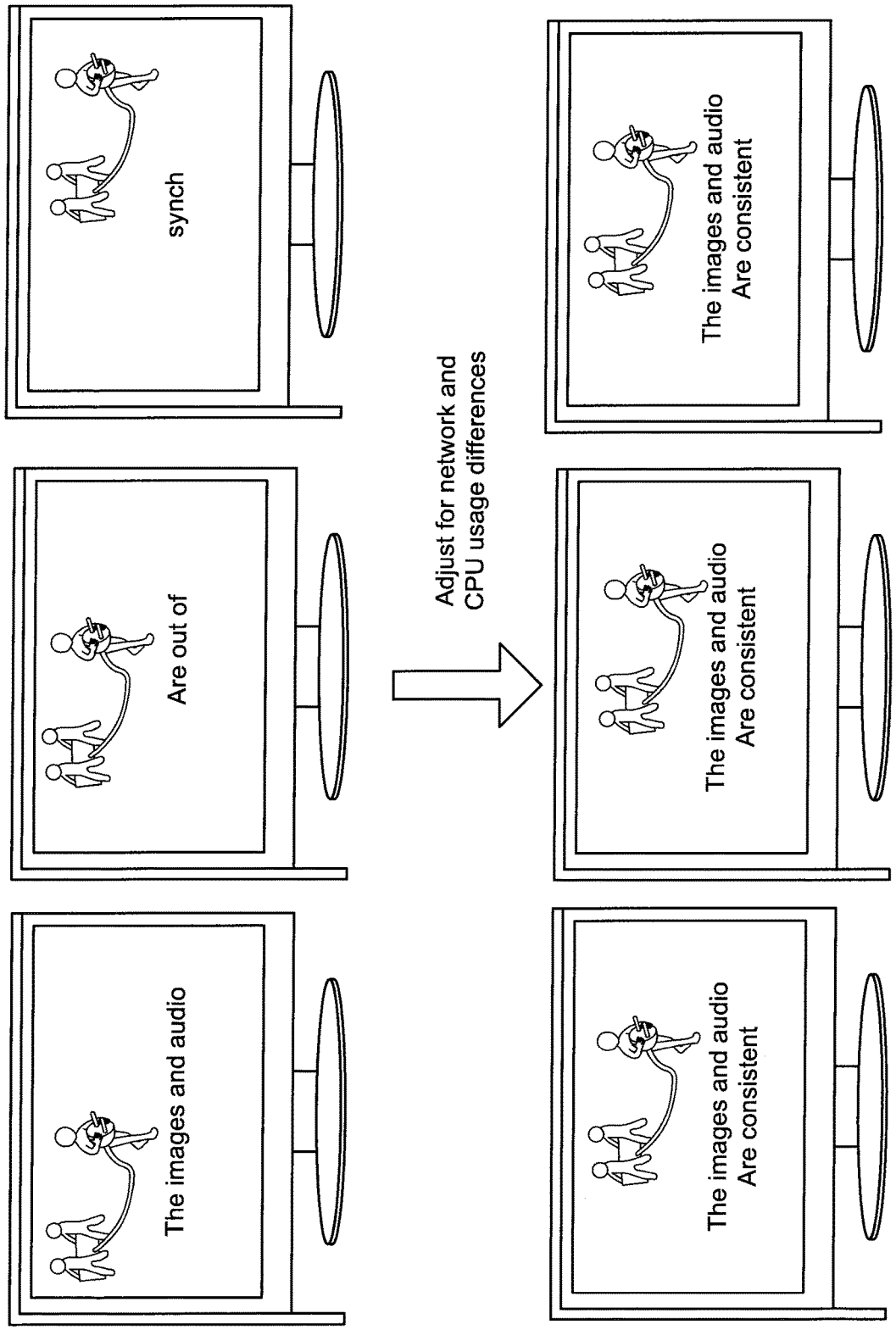
FIG. 7 depicts synchronization that can be performed according to one embodiment.

FIG. 7 depicts first, second, and third playback devices playing common content with timing differences between the playback being subject to a synchronization session to achieve synchronization of playback. In the depicted synchronization method of FIG. 7, network connection(s) and CPU loading can be provided for achieving synchronization. However, other synchronization methods are possible.

Certain embodiments herein offer technical computing advantages involving computing advantages to address problems arising in the realm of computer networks including computer networks to provide services to a plurality of users capable of communicating with the network. Embodiments herein includes features for improvement of the operation of computer systems in the environment wherein multiple playback devices provide common content. Embodiments herein relate to a specific manner of presenting content to users in a group environment wherein multiple computers present common content. Embodiments herein provide for detection of timing differences of playback devices and methods for achieving synchronized playback. Embodiments herein improve the performance of computing nodes in computer networks wherein different computing nodes exhibit different performance characteristics in dependence e.g. strength of network connectivity or CPU loading. Embodiments herein can reduce performance degradations in technical computing environment characterized by computing nodes having e.g. different network connectivity and/or CPU loading characteristics. Embodiments herein include features to provide synchronization correction between playback devices so that a first playback device is synchronized with a second playback device of an environment. Embodiments herein can employ various artificial intelligence (AI) processes including machine learning processes to learn the behaviors of playback devices over time in order to predict timing relations therebetween. Accordingly, in some embodiments, synchronization correction can be applied on an anticipatory basis without examination of video streams of the respective playback devices. In other embodiments, data of respective audio and/or video streams of playback devices are subject to examination to determine timing relationships between audio and/or video streams of playback devices which timing relationships can be used as correction data. Playback devices on receipt of correction data can respond to the correction data to achieve synchronization. In some embodiments video data processing can be utilized. For example, video data processing to count people within an environment and to associate people with respective playback devices. In another embodiment, a synchronization session can be activated by pointing a mobile device toward an environment having multiple playback devices. Screen capture of multiple playback devices can activate a synchronization process, which can include subjecting representations of different playback devices to image processing to determine timing differences between the playback devices. Embodiments herein can include use of decision data structures to drive action decision which can specify e.g. a scheme for achieving synchronization of multiple playback devices.

Figure 8:
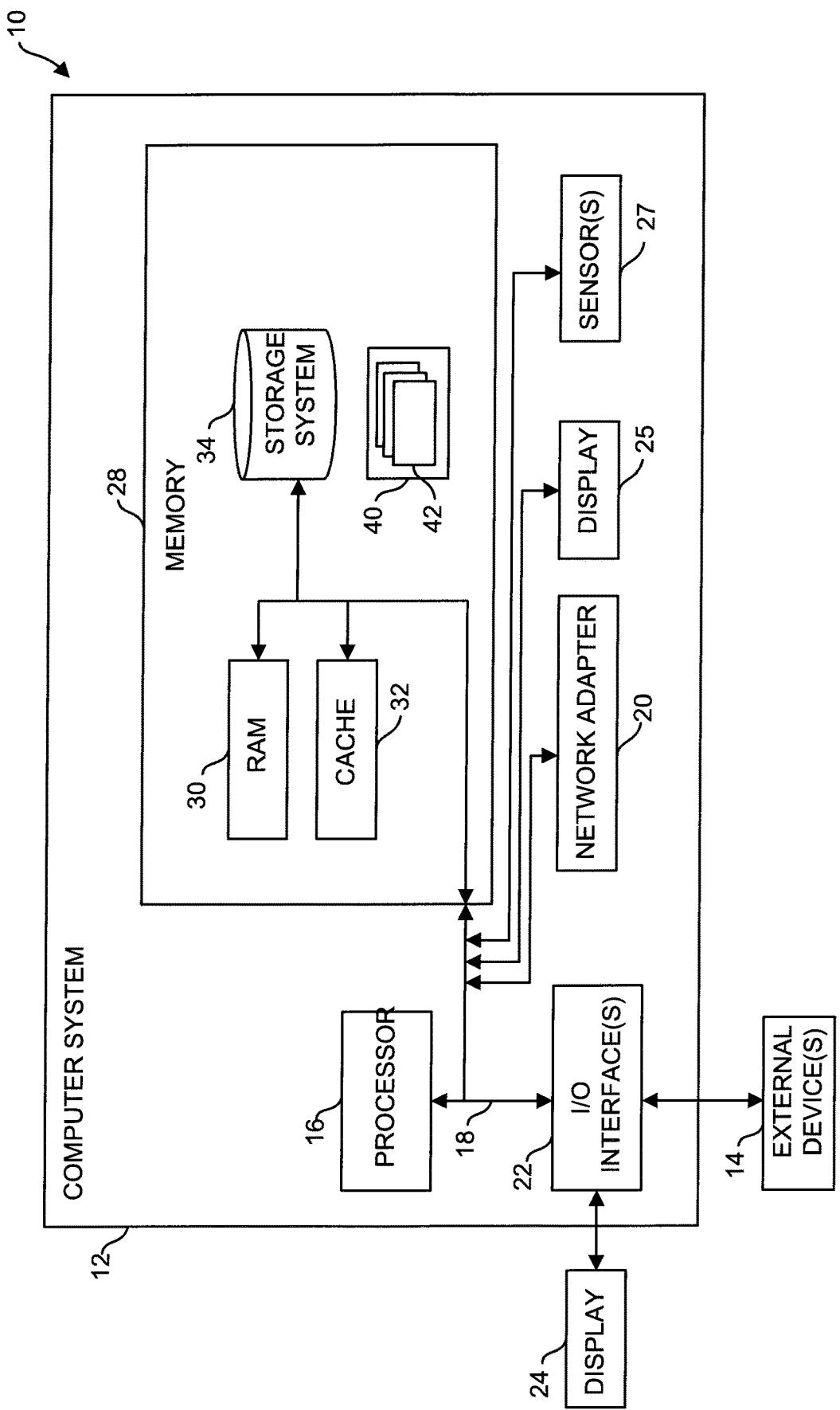
FIG. 8 depicts a computing node according to one embodiment.
Figure 9:
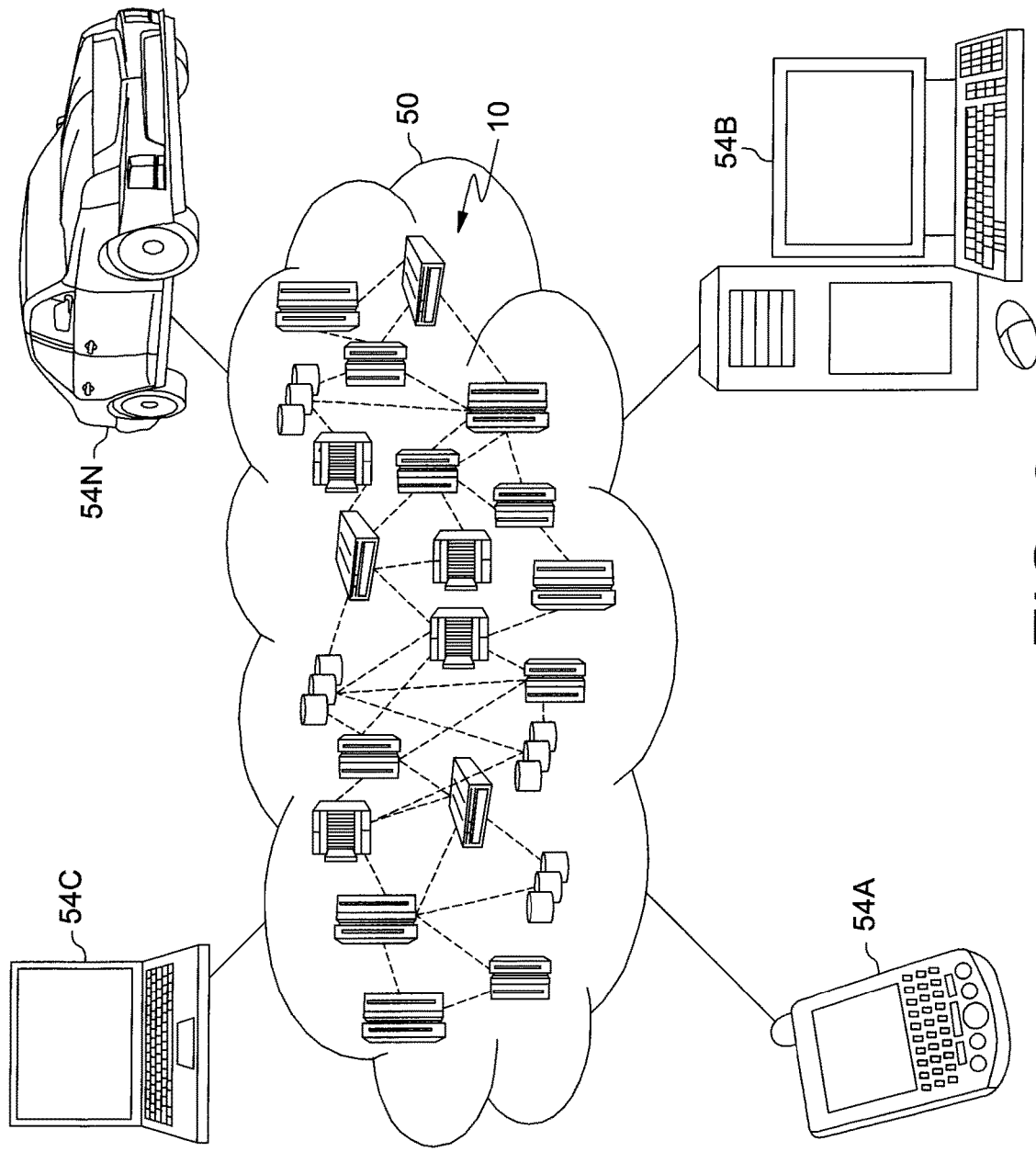
FIG. 9 depicts a cloud computing environment according to one embodiment.
Figure 10:
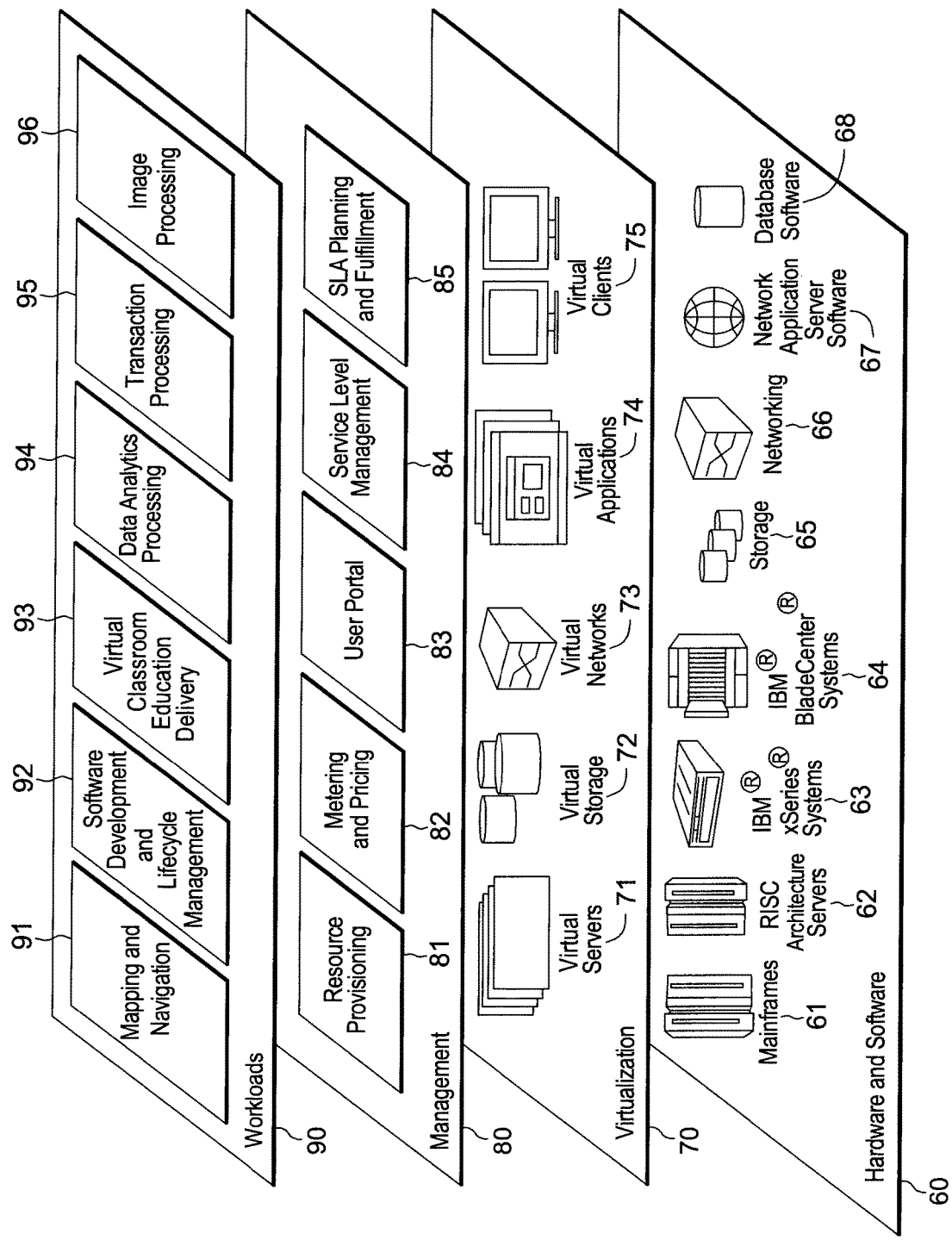
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 3 and the flowchart of FIG. 5. In one embodiment, one or more client computer device 130A-130Z can include one or more computing node 10 and can include one or more program 40 for performing functions described with reference to a playback device as set forth in the flowchart of FIG. 3 or FIG. 5. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for synchronizing playback devices as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
obtaining a first media stream, the first media stream being played on a first playback device and having first timestamps indicating when respective different time ordered sections of data defining the first media stream have been played by the first playback device;
obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times;
examining the first media stream and the second media stream, wherein the examining includes processing one or more timestamp of the first timestamps and one or more timestamp of the second timestamps;
generating, based on the examining, timing difference data that specifies a difference in playback timing between the first media stream and the second media stream being played, respectively, by the first playback device and the second playback device; and
using the timing difference data for performing synchronizing of the first media stream and the second media stream, wherein the method includes iteratively applying instances of timing data and playback IDs in combination as training data to a predictive model for training by machine learning of the predictive model, and wherein the method includes querying the predictive model with certain playback IDs to return output data, and using the output data for performing synchronizing between playback devices associated to the certain playback IDs.

2. The computer-implemented method of claim 1, wherein the obtaining a first media stream, the obtaining a second media stream, and the generating are performed in response a user selection of identifiers displayed in a displayed user interface, the identifiers specifying the first playback device and the second playback device.

3. The computer-implemented method of claim 1, wherein the obtaining a first media stream, obtaining a second media stream, and the generating are performed in response to a user obtaining a video representation of the first playback device and the second playback device using a camera equipped mobile computer device.

4. The computer-implemented method of claim 1, wherein the examining and the generating are performed by the first playback device.

5. The computer-implemented method of claim 1, wherein the examining and the generating are performed by a computing node external to the first playback device and the second playback device.

6. The computer-implemented method of claim 1, wherein the obtaining the first media stream, the obtaining the second media stream, the examining and the generating are performed by a computing node that is external to the first playback device and external to the second playback device, the computing node being provided by a hand held mobile client computer device, and wherein the obtaining the first media stream, the obtaining the second media stream, the examining and the generating are performed in response to entry by a user of the hand held mobile client computer device, of one or more input into a user interface of the hand held mobile client computer device.

7. The computer-implemented method of claim 1, wherein the second playback device is slower than the first playback device, and wherein the synchronizing includes one of the following selected from the group consisting of: (a) speeding up the first playback device, (b) slowing down the second playback device, and (c) speeding up the first playback device while simultaneously slowing down the second playback device.

8. The computer-implemented method of claim 1, wherein the method includes, in response to registration of the first playback device into a services providing system that provides the examining and the generating, transmitting to the first playback device and an installation package for installation on the first playback device, the installation package for configuring the first playback device to timestamp the first media stream to indicate when respective different time ordered sections of data defining the first media stream have been played by the first playback device.

9. The computer-implemented method of claim 1, wherein the second playback device is slower than the first playback device, and wherein the method includes increasing a media player speed of the first playback device for performing the synchronizing of the first media stream and the second media stream.

10. The computer-implemented method of claim 1, wherein the obtaining the first media stream, the obtaining the second media stream, the examining and the generating are performed by a computing node that is external to the first playback device and external to the second playback device.

11. The computer-implemented method of claim 1, wherein the second playback device is slower than the first playback device, and wherein the method includes unloading a process running on a CPU of the first playback device.

12. The computer-implemented method of claim 1, wherein the second playback device is slower than the first playback device, and wherein the method includes changing a network connection of the first playback device to a faster network.

13. The computer-implemented method of claim 1, wherein the first playback device and the second playback device are commonly in communication with a common data source, and simultaneously play common media streams obtained from the common data source.

14. The computer-implemented method of claim 1, wherein the method includes counting a number of persons associated to the first playback device, counting a number of persons associated to the second playback device, establishing that the first playback device is of higher priority than the second playback device based on the first playback device having more people associated to it that than the second playback device, and based on the establishing changing a speed of the second playback device without changing a speed of the first playback device, so that persons associated with first playback device enjoy uninterrupted viewing of the first playback device through the performing the synchronizing.

15. The computer-implemented method of claim 1, wherein the method includes applying a scoring function having multiple factors to the first playback device, applying the scoring function having the multiple factors to the second playback device, establishing that the first playback device is of higher priority than the second playback device based on the first playback device having a higher scoring function score than the second playback device, and based on the establishing changing a speed of the second playback device without changing a speed of the first playback device, so that persons associated with the first playback device enjoy uninterrupted viewing of the first playback device through the performing the synchronizing.

16. The computer-implemented method of claim 1, wherein the method includes determining an identity of a person associated to the first playback device, determining an identity of a person associated to the second playback device, establishing that the first playback device is of higher priority than the second playback device based on the first playback device having more people associated to it that the second playback device, and based on the establishing changing a speed of the second playback device without changing a speed of the first playback device, so that a person associated with first playback device enjoys uninterrupted viewing of the first playback device through the performing the synchronizing.

17. The computer-implemented method of claim 1, wherein the method includes obtaining, using a mobile computer device, image data representing the first playback device and the second playback device and people in an environment having the first playback device and the second playback device, processing the image data to provide correction data in dependence on a timing difference between the first media stream and the second media stream, processing the image data to count a number of persons associated to the first playback device, processing the image data to count a number of persons associated to the second playback device, establishing that the first playback device is of higher priority than the second playback device based on the first playback device having more people associated to it that the second playback device, and based on the establishing changing a speed of the second playback device without changing a speed of the second playback device, so that persons associated with the first playback device enjoy uninterrupted viewing of the first playback device through the performing the synchronizing.

18. A computer program product comprising:
a computer readable storage medium readable by one or more processing circuit and storing instructions for execution by one or more processor for performing a method comprising:
obtaining a first media stream, the first media stream being played on a first playback device and having first timestamps indicating when respective different time ordered sections of data defining the first media stream have been played by the first playback device;
obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times;
examining the first media stream and the second media stream, wherein the examining includes processing one or more timestamp of the first timestamps and one or more timestamp of the second timestamps;
generating, based on the examining, timing difference data that specifies a difference in playback timing between the first media stream and the second media stream being played, respectively, by the first playback device and the second playback device; and
using the timing difference data for performing synchronizing of the first media stream and the second media stream, wherein the method includes iteratively applying instances of timing data and playback IDs in combination as training data to a predictive model for training by machine learning of the predictive model, and wherein the method includes querying the predictive model with certain playback IDs to return output data, and using the output data for performing synchronizing between playback devices associated to the certain playback IDs.

19. A system comprising:
a memory;
at least one processor in communication with the memory; and
program instructions executable by one or more processor via the memory to perform a method comprising:
obtaining a first media stream, the first media stream being played on a first playback device and having first timestamps indicating when respective different time ordered sections of data defining the first media stream have been played by the first playback device;
obtaining a second media stream, the second media stream being played on a second playback device and having second timestamps indicating when respective different time ordered sections of data defining the second media stream have been played by the second playback device, wherein the first media stream and second media stream are common media streams being simultaneously played by the first playback device and the second playback device, respectively, at desynchronized times;
examining the first media stream and the second media stream, wherein the examining includes processing one or more timestamp of the first timestamps and one or more timestamp of the second timestamps;
generating, based on the examining, timing difference data that specifies a difference in playback timing between the first media stream and the second media stream being played, respectively, by the first playback device and the second playback device; and
using the timing difference data for performing synchronizing of the first media stream and the second media stream, wherein the method includes iteratively applying instances of timing data and playback IDs in combination as training data to a predictive model for training by machine learning of the predictive model, and wherein the method includes querying the predictive model with certain playback IDs to return output data, and using the output data for performing synchronizing between playback devices associated to the certain playback IDs.

20. The computer-implemented method of claim 1, wherein the playback devices associated to the certain playback IDs include the first playback device and the second playback device.

* * * * *